2,836,534

PHOSPHORUS-SULFUR COMPOUNDS

Gail H. Birum, Dayton, Ohio, assignor to Monsanto Chemical Company, St. Louis, Mo., a corporation of Delaware No Drawing. Application February 11, 1954
Serial No. 409,773

4 Claims. (Cl. 167—22)

The invention relates to organic compounds containing phosphorus and sulfur and deals more specifically with compounds of the thiophosphate series.

The invention provides as new compounds thiophosphates, having the general formula:

$$(RS)_x \overset{S}{\overset{\|}{P}} Cl_y$$

in which R is selected from the class consisting of alkyl radicals having from one to four carbon atoms, aryl radicals, and heterocyclic radicals, $x$ is a number from one to three, inclusive, $y$ is a number from zero to two, inclusive, and $x$ plus $y$ equals three. As illustrative of compounds having the above formula and provided by the invention may be mentioned S-trichloromethyl dichlorothiophosphate and bis(S-trichloromethyl) chlorotrithiophosphate, etc.

I have found that the present organic compounds may be prepared by contacting an inorganic phosphorus sulfide compound such as phosphorus sesquisulfide with a sulfenyl chloride, RSCl, in which R is selected from the class consisting of alkyl radicals having from one to four carbon atoms, aryl radicals, and heterocyclic radicals. Sulfenyl chlorides which may be employed include aliphatic sulfenyl chlorides, such as monochloromethanesulfenyl chloride, dichloromethanesulfenyl chloride, trichloromethanesulfenyl chloride, 2-chloroethanesulfenyl chloride and tert.-butanesulfenyl chloride. Aromatic sulfenyl chlorides which may be employed in the same relationship include benzenesulfenyl chloride and other chloro- and/or nitro-substituted compounds. The phenyl group may also be substituted with conventional radicals such as nitrile, sulfonyl or acyl groups, such as acetyl, for example. In addition to the phenyl radical the naphthyl derivatives may similarly be employed. The present reaction may also be carried out employing heterocyclic sulfenyl chlorides, such as 2-benzothiazolesulfenyl chloride and other thiazyl derivatives. In addition to the chloride derivatives, the corresponding bromides may similarly be employed.

The preparation of the compounds of the present invention may be carried out by mixing the phosphorus-sulfur starting material and the sulfenyl chloride. Stoichiometric proportions are preferred, although an excess of either starting compound may be employed. The reaction occurs to a considerable extent at room temperature but is accelerated at higher temperatures such as from 20° C. to 200° C., a preferred range being from 50° C. to 125° C. If desired, a solvent such as xylene, benzene or chloroform may also be employed. Distillation or crystallization is a preferred method of separating the final reaction products from the reaction mixture.

The present thiophosphate compounds are well-defined materials which are advantageously employed for a number of industrial purposes and are particularly valuable as chemical intermediates in the preparation of compounds having the thiophosphate radical as substituents, particularly in view of the possibility of providing active chlorine radicals to enable further reactions to be conducted with the products of the present invention. The compounds of the present invention are useful as insecticides, herbicides, and lubricant additives. The addition of the present compounds to heavier hydrocarbon fractions produces improved gear lubricants.

The phosphorus sulfides contemplated are the various possible sulfides and oxysulfides, a preferred group being those compounds in which the valence of phosphorus is less than five. Examples are the di-, tri- and heptasulfides.

The present invention is further illustrated, but not limited, by the following examples:

Example 1

Phosphorus sesquisulfide (55 g.) and trichloromethanesulfenyl chloride (372 g.) were placed in a flask and warmed to about 80° C. At this temperature the mixture was entirely liquid. The reaction mixture was then cooled to about 50° C., at which temperature a solid began to separate. The temperature was then raised to 120° C. At the end of an hour the dark red liquid product was distilled to obtain three major fractions which were separately analyzed as follows:

|  | P | S | Cl |
|---|---|---|---|
| (A) S-trichloromethyl dichlorothiophosphite: $n_D^{25}$ 1.5896— | | | |
| Calcd | 12.3 | 12.7 | 70.2 |
| Found | 12.06 | 13.27 | 67.0 |
| (B) S-trichloromethyl dichlorodithiophosphate: $n_D^{25}$ 1.6142— | | | |
| Calcd | 10.9 | 22.5 | 62.3 |
| Found | 8.64 | 21.80 | 62.49 |
| (C) bis(S-trichloromethyl) chlorotrithiophosphate: $n_D^{25}$ 1.6462— | | | |
| Calcd | 7.74 | 24.1 | 62.2 |
| Found | 7.72 | 25.0 | 61.04 |

Compound C, when subjected to insecticidal testing against Tribolium, showed 100% kill at 1% concentration and also displayed moderate activity against the 2-spotted mite at 0.2% concentration. This compound also showed marked herbicidal activity.

When subjected to microbiological testing against *Micrococcus pyogenes* var. *aureus*, Compound C was found to inhibit growth at 1:10,000 concentration, and when employed against *Salmonella typhosa*, it inhibited growth at 1:1,000 concentration.

The reaction mixture of (A), (B) and (C), after removal of unreacted material and solvent, but before separation into individual components was also tested for insecticidal and microbiological activity. It was found that a 100% kill against milkweed bug was obtained at 1% concentration. In bactericidal tests, inhibition of growth was obtained at 1:1,000 against *Micrococcus pyogenes* var. *aureus* and *Salmonella typhosa*, and at 1:10,000 against *Aspergillus niger*.

The details of the above testing procedures are described below:

*Preliminary.*—Trommel's malt agar was poured into a Petri plate and allowed to harden. A circular section was cut from the center and into this cup was placed 0.1 gram of the test compound. The plate was then sprayed with a fresh aqueous spore suspension of *Aspergillus niger* and incubated at a temperature of 28° C. for five days. Inspection of the incubated plate at the end of that time showed no growth of *Aspergillus niger* within a 5 mm. zone.

*Secondary.*—To 100 cc. of hot Trommel's malt agar was added 0.1 gram of the test compound. The agar was then whipped into an emulsion and poured into a cold plate and allowed to harden. Fifty cc. of hot agar was added to 50 cc. of the above toxic agar to give a compound concentration of 0.05 percent. To 10 cc. of the remaining toxic agar was added 90 cc. of agar to give a concentration of 0.005 percent. Petri dishes were filled from each of the two mixtures, i. e., that having a concentration of 0.05 percent and that having an 0.005 percent concentration. The plates were then sprayed with *Aspergillus niger* and incubated at a temperature of 28° C. for five days. At the end of that time inspection of the plates showed that on plates of both the 0.05 percent and 0.005 percent concentration the growth of *Aspergillus niger* was completely inhibited.

In tests made on the spores of the fungus *Micrococcus pyogenes* var. *aureus* a concentration of 1:10,000 was found to inhibit growth. When employed against *Salmonella typhosa* inhibition of growth was found to occur at 1:10,000 concentration.

The compound bis(S-trichloromethyl) chlorotrithiophosphate was extremely toxic against Tribolium which had been transferred to bean plants that had been sprayed with a 1% aqueous emulsion of the said compound. The kill in this test was found to be 100%.

This test shows the insecticidal activity of bis(S-trichloromethyl) chlorotrithiophosphate. The following testing procedures were used.

(1) *Contact drop application.*—To fifth instar milkweed bugs there was applied a measured drop of the compound at 1.0 percent concentration in acetone on the dorsal part of the thorax. Application was by means of a micrometer device actuating the plunger of a hypodermic needle.

(2) *Residue test.*—Petri dishes were sprayed with acetone solutions of the compound at the concentrations shown below. The sprayed dishes were allowed to dry, Tribolium beetles or third instar milkweed bugs were placed on the sprayed and dried surfaces, and confined there for 48 hours. Spraying of the dishes was conducted by means of a precision sprayer in a modified horizontal Hoskins spray chamber.

(3) *Spraying of infested plants.*—Bean plants infested with the 2-spotted mite were sprayed with an atomizer on both leaf surfaces at indicated concentrations of the compound in a cyclohexanone-water emulsion. The plants are then held for seven days for observation of kill of mites and their eggs.

(4) *Contact of residue on plants.*—Free bean plants were sprayed with a cyclohexane-water emulsion of the compound at the indicated concentration, the spray on the plants was allowed to become thoroughly dry, and mites were transferred to plants supporting the dried residue. At the end of seven days, observation was made of kill of mites.

The present compositions are generally applied for insecticidal use in the form of sprays or aerosols. The spray may be prepared by dissolving the compounds in the usual organic solvents, e. g., acetone, hexane, benzene or carbon tetrachloride or by incorporating them into aqueous emulsions. The compounds may also be dissolved in liquefied gases such as the fluorochloroethanes or methyl chloride and applied from aerosol bombs made from the solutions.

Instead of employing liquids as carriers and diluents, insecticidal dusts comprising the present compound may be prepared. For example, they may be incorporated with a solid carrier such as talc, clay, lime, bentonite, pumice, fuller's earth, etc., and employed generally as pesticidal dusts.

*Example 2*

The reaction of trichloromethanesulfenyl chloride and phosphorus sesquisulfide was carried out similarly to Example 1, except that xylene was employed as a solvent. It was found that the reaction proceeded substantially as in Example 1, except that the temperature rise was more gradual. It was also observed that the reaction proceeded with a slow evolution of acidic gases.

*Example 3*

The reaction of phosphorus sesquisulfide with parachlorobenzenesulfenyl chloride was carried out by the same procedure set forth in Example 1. It was found that an overall yield of about 90% was obtained of the following thiophosphites and thiophosphates: S-(parachlorophenyl) dichlorothiophosphite, S-(para-chlorophenyl) dichlorodithiophosphate and bis[S-(para-chlorophenyl)] chlorotrithiophosphate.

*Example 4*

A reaction similar to that of Example 1 was conducted employing phosphorus sesquisulfide with orthonitrobenzenesulfenyl chloride. The products obtained in this case were S-(ortho-nitrophenyl) dichlorothiophosphite, S-(ortho-nitrophenyl) dichlorodithiophosphate and bis[S-(ortho-nitrophenyl)] chlorotrithiophosphate.

What is claimed is:

1. The method of preparing compounds having the formula:

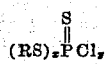

in which R is selected from the class consisting of alkyl radicals having from one to four carbon atoms, aryl radicals, and heterocyclic radicals, $x$ is a number from one to three, inclusive, $y$ is a number from zero to two, inclusive, and $x$ plus $y$ equals three, which comprises reacting a phosphorus sulfide with a sulfenyl chloride, RSCl, in which R is selected from the class consisting of alkyl radicals having from one to four carbon atoms, aryl radicals, and heterocyclic radicals.

2. The method of preparing bis(S-trichloromethyl) chlorotrithiophosphate which comprises heating a phosphorus sulfide with trichloromethanesulfenyl chloride at a temperature of 20° C. to 200° C.

3. The method of destroying insects which comprises exposing said insects to a toxic quantity of an insecticidal composition comprising an inert carrier and as the active ingredient in a quantity which is toxic to insects, bis(S-trichloromethyl) chlorotrithiophosphate.

4. The method of preparing compounds having the formula:

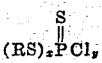

in which R is an alkyl radical having from one to four carbon atoms, $x$ is a number from one to three, inclusive, $y$ is a number from zero to two, inclusive, and $x$ plus $y$ equals three, which comprises reacting a phosphorus sulfide with a sulfenyl chloride, RSCl, in which R is an alkyl radical having from one to four carbon atoms.

References Cited in the file of this patent

UNITED STATES PATENTS

| 2,063,629 | Salzberg et al. | Dec. 8, 1936 |
| 2,335,953 | McCracken et al. | Dec. 7, 1943 |
| 2,679,508 | Gysin | May 25, 1954 |
| 2,682,554 | Crouch et al. | June 29, 1954 |

FOREIGN PATENTS

| 257,649 | Switzerland | May 2, 1940 |

OTHER REFERENCES

Gottlieb: J. Am. Chem. Soc., vol. 54, 1932, p. 750.